May 28, 1968    L. G. WENGER ET AL    3,385,709
TREATMENT OF OLEAGINOUS SUBSTANCES
Filed June 3, 1965    3 Sheets-Sheet 1
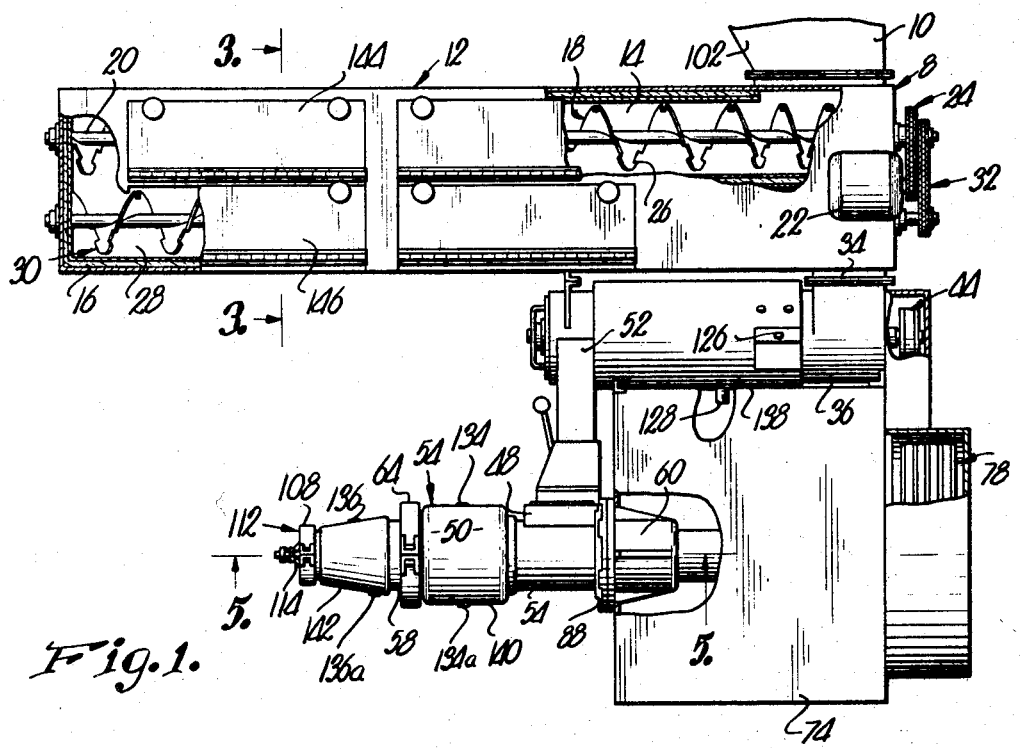
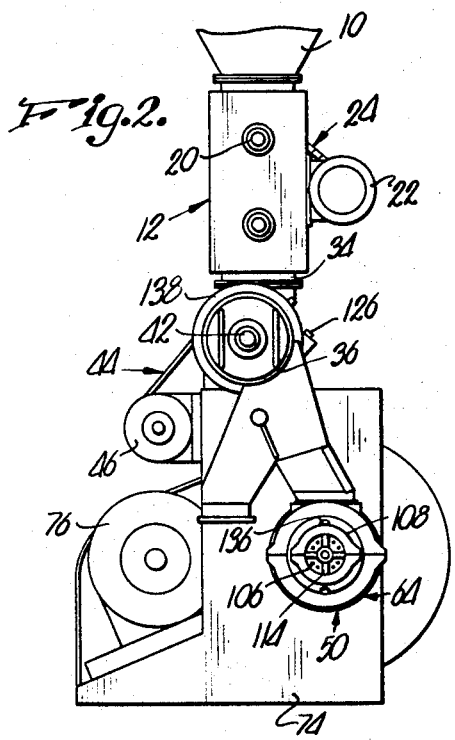
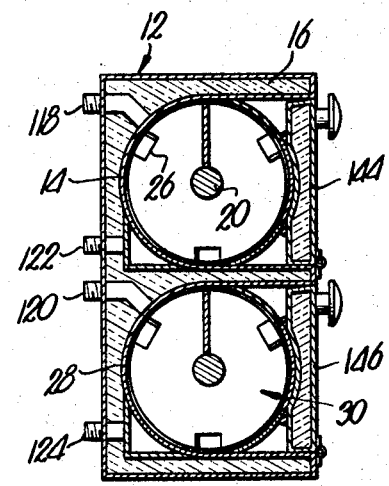
INVENTORS.
LaVon G. Wenger
BY Louis Wenger
ATTORNEYS.

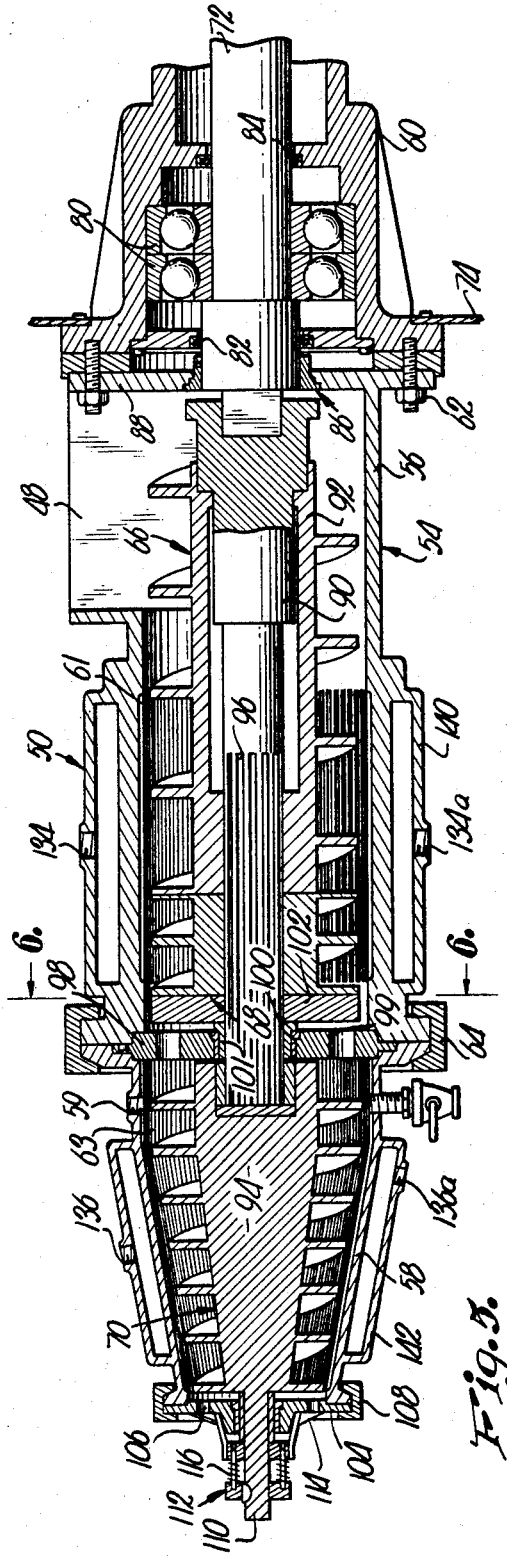
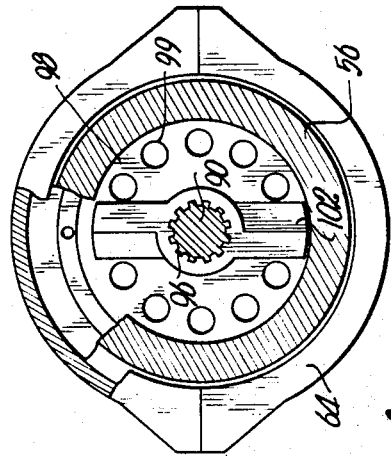
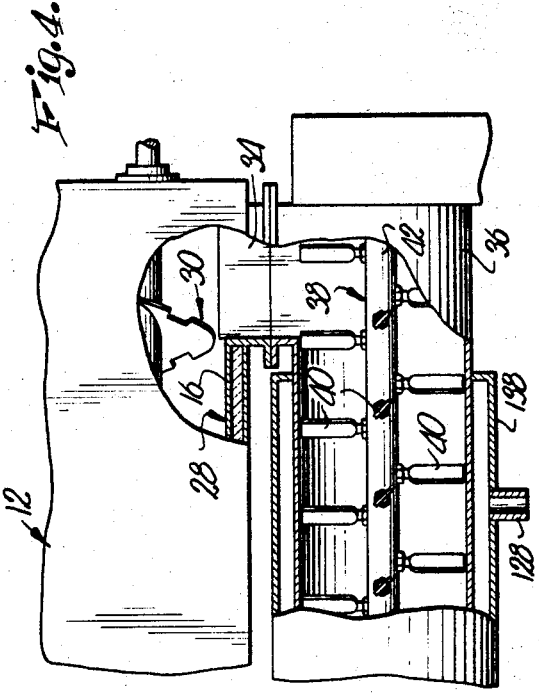
INVENTORS.
LaVon G. Wenger
BY Louis Wenger

May 28, 1968 L. G. WENGER ET AL 3,385,709

TREATMENT OF OLEAGINOUS SUBSTANCES

Filed June 3, 1965 3 Sheets-Sheet 3

INVENTORS.
Lavon G. Wenger
Louis Wenger

BY
Hovey, Schmidt, Johnson & Hovey.
ATTORNEYS.

United States Patent Office 3,385,709
Patented May 28, 1968

3,385,709
TREATMENT OF OLEAGINOUS SUBSTANCES
Lavon G. Wenger and Louis Wenger, Sabetha, Kans., assignors to Wenger Manufacturing, Inc., Sabetha, Kans., a corporation of Kansas
Continuation-in-part of application Ser. No. 136,010, Sept. 5, 1961. This application June 3, 1965, Ser. No. 467,171
8 Claims. (Cl. 99—2)

ABSTRACT OF THE DISCLOSURE

Continuous treatment of oleaginous products, such as seeds or beans, for reduction of the growth inhibitors therein, by passing the product through a preconditioner in which team is injected to raise the temperature of the product of about 180° to 210° F., passing the product through an extruder and increasing the pressure in a coned nose section of the extruder so that the product emerges from said section at a temperature not lower than approximately 250° F.

---

This is a continuation-in-part of our copending application Ser. No. 136,010, filed Sept. 5, 1961, and entitled "Treatment of Oleaginous Substances," now abandoned.

This invention relates to a method of continuous treatment of oleaginous substances and particularly to a novel process for efficiently treating oleaginous agricultural products such as seeds or beans having growth inhibition material therein, to effectively destroy the inhibitors so that the products may be fed to various types of animals.

It has been known for some time that certain oleaginous agricultural products contain materials therein which act as growth inhibitors when the products are fed to certain animals or humans. For example, raw soybeans cannot be fed to chickens and swine as well as young calves, because of a growth inhibitor in the raw beans which is known to inhibit the activity of trypsin in the digestive system of the animals and thereby limiting the protein utilization by man or animal. Research work over a period of time indicated that the growth inhibitor could be destroyed or repressed by cooking the meal prior to feeding of the same to poultry, swine and young calves.

Trypsin is a proteolytic enzyme of the pancreatic juice which converts proteins to peptones. Since peptones are defined as any one of a group of diffusible, soluble substances produced by hydrolysis of proteins, it can be seen that reduction of the amount of trypsin in the animal's digestive system, or deactivation of a quantity of the trypsin, materially affects the animal's ability to completely convert protein received in the digestive system. The growth inhibitor in uncooked soybeans thereby partially destroys the ability of humans, poultry, swine, young beef calves (under one year) and other similar animals, to convert protein as completely as possible into digestible peptones. Thus, in order to destroy the growth inhibitor contained in raw soybeans, it has been found necessary to cook the beans prior to utilization of the same for feed purposes.

As used herein, the term "growth inhibitor" is meant to include those substances contained in oleaginous agricultural products which are heat labile in that they are destroyed or effectively repressed when exposed to heat of predetermined temperature, but until destroyed or repressed operate to (a) make some nutritional factor unavailable to the animal; or (b) affect a specific growth factor such as modification of basic amino acids such as methionine, cystine and similar substances; or (c) to have an anti-enzymic effect as for example, the effect that the growth inhibitor in raw soybeans has on trypsin in the animal's digestive system. It is also to be understood that whenever the term "bean" is used along herein, it is meant to include beans as well as seeds as these words are employed in this art.

Thus, in addition to soybeans, field beans and field peas and certain other pulses such as Bengal gram, chick pea, garbanzo, lima beans, navy beans, kidney beans, pinto beans, white beans, etc., have been found to contain substances which meet the requirements set forth above with respect to the definition of a growth inhibiting material. Studies have shown that the growth inhibitors in field beans and field peas may also be repressed or destroyed by cooking or heating the agricultural product to a predetermined temperature level.

Problems have arisen in the treatment of soybeans, field beans and field peas and certain other pulses of the foregoing types in an attempt to destroy or minimize the effect of the growth inhibitors on the animals to which the products are fed. If heating or cooking of the raw products is too severe, the nutritional value of the substances is substantially reduced, yet it is necessary to raise the temperature of the products to a sufficient level to effectively destroy the growth inhibition material contained in the oleaginous substances. Furthermore, the products are intended as feed for animals and therefore, it is necessary that the cost of treating the oleaginous products be maintained at an absolute minimum in order to make the treatment process economically feasible. Batch methods of cooking the products have been employed but the same are too expensive to be economically practicable on a large scale and, furthermore, necessitate the utilization of relatively large, expensive equipment which is beyond the means of small operators who have limited capital and facilities available.

It is, therefore, the primary object of the present invention to provide a method of treating oleaginous agricultural products or pulses having a growth inhibitor therein, which may be carried out inexpensively, with a minimum amount of equipment and on any desired scale depending upon the quantities of the product to be processed by a particular operator.

A further important object of the invention is to provide a method of treating oleaginous agricultural products of the types specified wherein heating of the products to a required level may be carried out on a continuous basis and with the only requirement being the provision of means for continuously supplying raw products to the treatment apparatus and removal of the cooked substance from the discharge end of the processing equipment.

Another object of the invention is to provide a continuous method of treating oleaginous agricultural products having a growth inhibitor therein, wherein continuous heating of the products to a predetermined level may be accomplished by employing equipment having a preconditioning chamber for initially raising the temperature of the products while the moisture content thereof is increased, and then raising the temperature of the heated products to a sufficient level to effect destruction or reduction of effects of the growth inhibitors contained therein, by gradually increasing the pressure on the products in a second zone until the temperature level thereof has been increased to a predetermined point whereupon the pressure on the products is instantaneously released, thereby effecting relatively rapid cooling of the oleaginous substances whereby the treatment process may be carried out in a very efficient and inexpensive manner with a minimum of space being required.

An additional important object of the invention is to provide a method of continuously treating raw oleaginous agricultural products having growth inhibitors therein, by utiliziation of equipment presently owned by a large number of food and feed processing operators and with the equipment being usable for carrying out the present method by alteration of the apparatus to a minor degree, thereby obviating the necessity of the feed producers purchasing a large amount of new equipment or expanding their plant facilities in order to accommodate the present treatment process. In this respect, it is an additional object of the invention to provide a method of treating oleaginous agricultural products as referred to above wherein expansion pelleting equipment, as well as modified pellet mills, may be suitably equipped to effect continuous treatment of soybeans, field beans and field peas and certain other pulses in order to destroy the growth inhibitor therein.

A still further important object of the invention is to provide a method of processing oleaginous agricultural products wherein the temperature of the products is effectively raised to a level sufficient to effect destruction or reduction of the growth inhibition material contained therein, by the expedient of passing the products through a cone-shaped member positioned with the narrow end thereof as the outlet so that the pressure on the products is gradually and progressively increased as the products are forced through the conical structure and thereby effecting gradual and progressive rise of the temperature of the oleaginous substances and minimizing the amount of external heat required to be introduced into the products as the temperature of the same is raised to a predetermined level.

Another important object of the invention is to provide an efficient and effective method of treating oleaginous agricultural products having growth inhibitors therein, and employing apparatus provided with means for surrounding the products with a zone of relatively high temperature heat so that thermal energy is transferred directly into the products, structure for agitating the products to expose the moist surface areas of the oleaginous substances to the heated zone, and means for introducing steam into the products during advancement thereof through the heated zone so that the temperature of the products is raised very rapidly to substantially the level required to effect destruction of the growth inhibiting material. In this respect, it is a further important object to provide a method of effectively cooking an oleaginous product as set forth wherein efficient introduction of heat into the product is obtained utilizing steam jacketed equipment and means for introducing steam into the product but with a minimum quantity of moisture as steam being introduced into the product during treatment thereof by virtue of utilization of a novel cone through which the product is advanced to materially increase the pressure on the product and effect final raising of the temperature level thereof to a point sufficient to destroy or reduce the effects of the growth inhibitors in the same.

It is yet a further object of this invention to provide a method of treating full-fat oleaginous beans wherein the peak temperature of the product is achieved in the final stage of the treatment operation and wherein the peak temperature is maintained for a time period which is sufficiently short to avoid harming the protein constituents of the product yet is adequate to destroy the growth inhibitors thereof.

Another object of the invention is to provide a method of treating oleaginous agricultural products having growth inhibitors therein wherein the final treated product is in a form adapting the same for later incorporation into other foods and feeds, or pelleted after processing.

Other important objects and details of the present method will become apparent or be explained in greater detail as the following description progresses.

In the drawings:

FIGURE 1 is a fragmentary, side elevational view of apparatus which may be advantageously employed in carrying out the present method of treating oleaginous agricultural products;

FIG. 2 is a fragmentary, end elevational view of the apparatus shown in FIG. 1;

FIG. 3 is an enlarged, transverse sectional view taken on the vertical line 3—3 of FIG. 1;

FIG. 4 is an enlarged, fragmentary, side elevational view similar to FIG. 1, parts being broken away and in section to reveal details of construction;

FIG. 5 is a longitudinal, fragmentary, sectional view taken on line 5—5 of FIG. 1;

FIG. 6 is a transverse, sectional view taken on line 6—6 of FIG. 5, parts thereof being broken away and in section to further illustrate the details of construction of the same;

Figure 7:
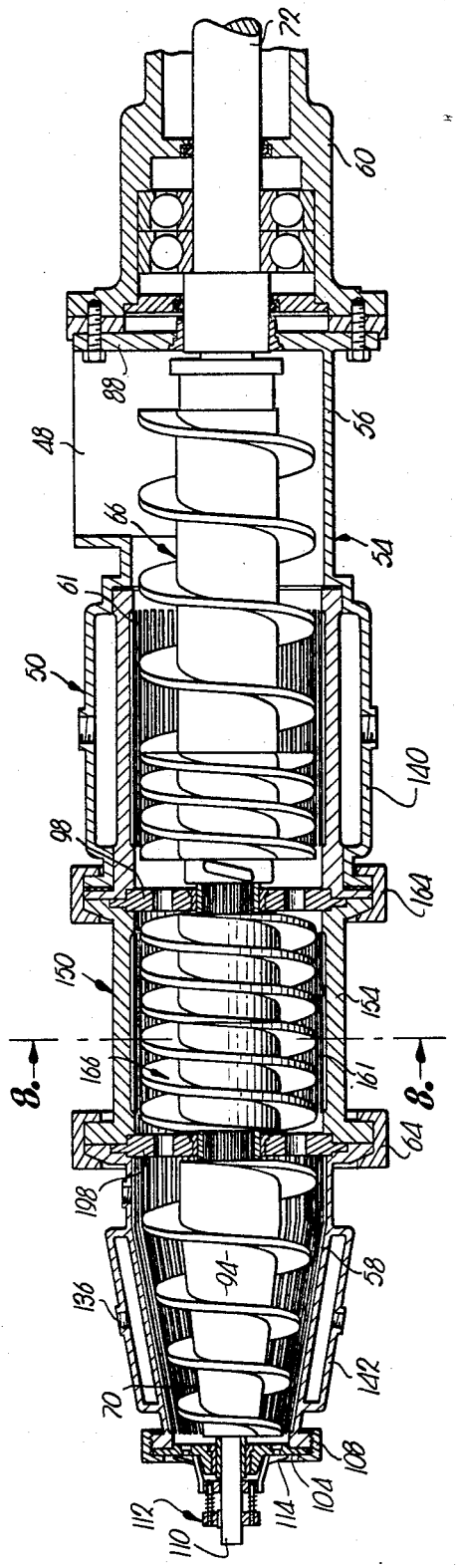
FIG. 7 is a view similar to FIG. 5, but illustrating another form of the apparatus for carrying out the method.
Figure 8:
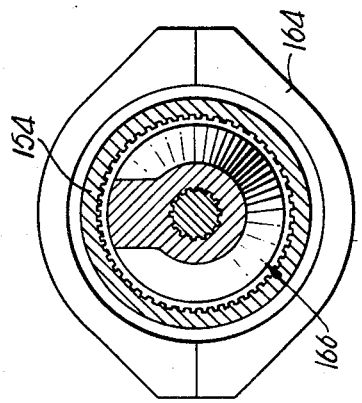
FIG. 8 is a view taken along line 8—8 of FIG. 7.

Briefly, the present method contemplates the grinding or flaking of whole oleaginous seeds or pulses by some appropriate means and thereafter advancement of the ground oleaginous agriculture products to be treated, continuously along a predetermined path of travel through treatment equipment in a manner to efficiently and quickly raise the temperature of the products to a level sufficient to destroy or reduce the effects of growth inhibition material contained in the products but without adversely affecting the nutritive value of the agricultural products. In order to rapidly raise the temperature of the products to the required level, the oleaginous substance is passed through a first preconditioning zone which is steam jacketed and has means for introducing a quantity of steam into the products during agitation and advancement thereof so that the products are raised to a temperature of approximately 180° to 210° F. in a very short interval of time. Next, the heated products are passed through a second high speed mixing and conditioning zone where the temperature thereof is maintained at approximately 200° to 215° F. and with relatively rapid agitation and tumbling of the material being effected in the second conditioning zone to assure heating of all of the product to a uniform temperature. Finally, the product is forced through a third zone comprising an extrusion press fitted with a conical member to increase the pressure on the product sufficiently to raise the temperature thereof to at least approximately 250° F. in order to destroy or reduce the effects of the growth inhibiting material contained in the agricultural product and with the pressure on the substance being released as the same emerges from the conical member. The final material, which emerges from the machine in the form of one or more extruded ribbons, may be cut into suitable pellet size for direct feeding to animals or may be reduced in particle size thereafter to meal or granular form and mixed thereafter with other feeds if desired.

Products to be treated pursuant to the method of the present invention may be introduced into the apparatus illustrated in the drawings and broadly numerated 8, by way of a hopper 10 and illustrated in FIGS. 1 and 2. The hopper 10 communicates with a housing 12 therebelow at one end of the latter, and more particularly, with an elongated, horizontal tube 14 contained within the housing 12 and surrounded by insulation 16. Means for continuously and uninterruptedly conveying the product from the hopper 10 to the opposite end of the housing 12, is contained within the tube 14 and takes the form of a cut-flight screw 18 coextensive in length with the tube 14 and having its shaft 20 disposed coincidentally with the horizontal axis of tube 14. The screw 18 is rotated at a predetermined speed through the medium of a suitable prime mover such as an electric motor 22 carried by the housing 12, and operably coupled with the shaft 20 by chain and sprocket means 24. The screw 18 is characterized as a cut-flight conveyor by virtue of the fact that its helical convolutions are provided with a series of spaced notches 26 in the outer periphery thereof.

A second tube 28 within housing 12, below the tube 14 and in parallelism therewith, is provided with a screw conveyor 30 driven by the prime mover 22 through chain and sprocket means 32. Tube 14 communicates at its discharge end with the tube 28; hence, the material therein is conveyed to the right viewing FIG. 1 and thereby effects dumping of the product into a throat 34 (FIG. 4) that in turn communicates with a substantially shorter, normally horizontal tube 36 therebelow. It can be seen that the throat 34 is directly below the hopper 10 and in vertical alignment with tubes 14 and 28. The tube 36 contains a blender or mixer 38 provided with a multitude of paddles 40, extending radially from the shaft 42 carrying the same, it being noted that shaft 42 is in turn driven by belt and pulley means 44 operably coupled with an electrical motor 46. Tube 36 communicates with an inlet 48 (FIG. 5) of an expansion pelleting head broadly designated 50 and adapted to be removably secured to housing 12. Conduit 52 serves to connect tube 36 with the inlet throat 48 whereby the product is conveyed laterally from conduit 52 within the head 50.

The tubular housing 54 of head 50 is provided with a central section 56 (having inlet 48 as an integral part thereof) and a pair of end sections 58 and 60. Rifling 61 and 63 is provided in sections 56 and 58 respectively, extending longitudinally thereof and around the entire circumference of the inner surfaces thereof. Suitable fasteners 62 interconnect the sections 56 and 60 in end-to-end relationship, and a circular, sectional clamp 64 surrounds the sections 56 and 58 and thereby releasably interconnects the same. The section 56 contains a relatively long screw 66 in coaxial relationship therewith, as well as a somewhat shorter screw 68, whereas the tapered end or head section 58 is provided with a tapered screw 70. These three screws are driven by a shaft 72 passing through the section 60 and through a housing 74 for operable connection with a prime mover 76 by way of belt and pulley means 78.

Bearings 80 within the end section 60 support the shaft 72 while seals 82 and 84 surrounding shaft 72 within the end section 60 preclude leakage of lubricant from section 60. An additional rotating seal 86 on the shaft 72 is journalled within end plate 88 of main section 56, which end plate 88 also receives the fasteners 62.

A central driving shaft 90 for the screws 66, 68 and 70, connected to shaft 72 and projecting outwardly therefrom within section 56, is surrounded by the tubular shaft 92 of screw 66. The screw 68 also surrounds the shaft 90 and the latter extends into one end of the core 94 of screw 70. Shaft 90 has longitudinally extending splines 96 thereon to provide a driving interconnection with all of the screws 66, 68 and 70.

A steam lock die 98, having a plurality of circumferentially arranged die openings 99 therein (FIG. 6) is releasably clamped in place between sections 56 and 58 in surrounding relationship to shaft 90 and receives a bushing 100 which, in turn, carries a bushing 101 splined to shaft 90. Agitator 102 on shaft 90 adjacent the outer extremity of section 54, is interposed between the bushings 100 and 101, and the proximal end of the screw 68.

A die 104, having a number of openings 106 therein, is releasably attached to the outermost free end of the conical nose section 58 by a clamp 108 and journals an extension 110 of the core 94. If desired, a knife assembly 112, keyed to the extension 110 for rotation therewith, is provided with a plurality of blades 114 held biased against the outer face of die 104 by spring means 116 forming a part of the assembly 112, it being understood that the blades 114 rotate continuously across the die openings 106 with respect to the fixed die 104.

The preconditioner of the apparatus thus far described includes the dual stage steamer feeder contained in the housing 12 and the mixing-conditioning tube or cylinder 36. Steam inlets 118 and 120 communicate with the tubes 14 and 28 respectively to permit steam to be introduced into the material contained therein. Steam inlets 122 and 124 connected to housing 12 are provided for introducing steam into the interior of housing 12 exteriorly of the tubes 14 and 28 respectively.

In a similar manner, steam is introduced into the cylinder 36 through inlet 126 and to hollow casing surrounding the same through steam inlet 128 (FIG. 1).

The head 50 is likewise provided with means to heat the material being treated and therefore, section 56 of the housing 54 has an inlet 134 for the purpose of permitting steam to be introduced to the jacket of section 56. Similarly, a steam inlet 136 is provided in the hollow jacket of section 58 so that steam may be provided around cone section 58. Jackets 138, 140 and 142 around the cylinder 36, the section 56 and the section 58 respectively, receive the steam, and the housing 12, constructed as best seen in FIG. 3, serves as the jacket for the tubes 14 and 28. Steam condensate return openings are provided for all of the jackets as for example at 134a and 136a as shown in FIGS. 1 and 4 with respect to the jackets 134 and 136. Service doors 144 and 146 are provided in the housing 12 to permit access to the tubes 14 and 28 respectively.

The agricultural product to be treated in apparatus 8 is introduced thereinto through hopper 10 whereby the screw 18 conveys such material longitudinally of tube 14 as shaft 20 is rotated by motor 22 through chain and sprocket means 24. It is important that the product be advanced continuously and uninterruptedly from the time it enters the first tube 14 of the preconditioner, until the processed product is released from the head 50 through the die 104. This is important in order to efficiently and uniformly raise the temperature of the product to a required level in a minimum of time and without excessive heating of such product, which might tend to reduce the nutritive value thereof. Hence, it is to be preferred that all of the prime movers for actuating the various material advancing components of the apparatus, as above described, be continuously operable simultaneously and also of construction allowing the operator of apparatus 8 to readily and independently vary the speed of operation of such motors, so that the material advancement may be accurately controlled at all times. Whether or not the product can be choke-fed in the preconditioner depends upon operating conditions and the nature of the product being treated. In any event, it is to be recognized that the product should be passed through apparatus 8 at a speed to effect raising of the temperature thereof to the desired level in a minimum of time and with raw products being continuously introduced into the hopper 10 and also continuously displaced from the head 50.

The cut-flight conveyors 18 and 30 serve the purpose of continuously advancing the product along tubes 14 and 28 respectively while gradually and progressively mixing and blending the raw product with steam and thereby effecting gradual and progressive raising of the temperature of the entire mass.

The preconditioner defined by tubes 14 and 28 accomplishes raising of the temperature of the product in a minimum of time by virtue of the fact that steam is introduced into the material through the inlets 118 and 120 in an amount to raise the temperature of the product without excessively increasing the moisture content thereof. In practice, it has been found that the product moisture content should not be appreciably raised more than 5% to 10% over the moisture level at which the product is introduced into hopper 10 and therefore, the screws 18 and 30 are caused to rotate at a speed whereby the product will be raised to a temperature of from approximately 180° F. to 210° F. before the heated material is caused to pass into the mixing conditioning chamber 36 through the throat 34. Other factors important in raising of the temperature of the product within tubes 14 and 28 include the steam jackets within housing 12 in surrounding relationship to the outer surfaces of tubes 14 and 28 and which serve to prevent heat loss to the atmosphere from the product itself, and also tending to assist in raising the temperature of the material as it is passed longitudinally through the heated zone and which might advantageously completely envelop the entire path of travel of the product from the time it enters the first tube 14 until it is discharged from the head 50.

The mixing and conditioning cylinder 36 is designed to quickly, efficiently and thoroughly agitate the material therewithin to assure that all of the particles thereof are at substantially the same temperature level, and is constructed in a manner to maintain the product at the time the same is directed into head 50, at the same approximate temperature of the product as the same enters cylinder 36 through throat 34. Steam is preferably introduced into cylinder 36 through inlet 126, thereby assisting in maintenance of the temperature of the product at the desired level and also allowing the operator of apparatus 8 to increase the temperature of the product at this point if the same is below the prescribed level. The steam within jacket 138 surrounding tube 36 operates to prevent loss of heat from the product within cylinder 36 and in certain instances may raise the temperature of the product slightly as the same is conveyed longitudinally of cylinder 36 by mixer 38. It can be seen that the paddles 40, which differ in pitch from the helical flights of screws 18 and 30, thoroughly agitate the product to assure intimate admixture of the steam therewith and assures a uniform product temperature as the same is introduced into the head 50.

It is noted additionally, that rise in temperature of the product is in part accountable to mechanical friction which results from the pressures that are necessarily exerted upon the product as an incidence to advancement of the same through the various cylindrical chambers by the screws 26 and 28 as well as the mixer 38. After mixing and blending of the product within tube 36 by mixer 38, the product at a temperature of approximately 200° F. to 215 F. is then directed into head 50 through throat 48 whereby the screws 66 and 68 shift the product laterally toward the conical section 58, and with the steam jackets 140 and 142 around sections 54 and 58 serving to at least maintain the product at the defined temperature and in fact, actually raising the temperature thereof slightly. It can be seen that the temperature of the product is gradually and progressively raised in all of the sections.

Upon introduction of the heated material into head 50 from cylinder 36, the screw 66 shifts the material toward die 104, thereby effecting compression of the product under a relatively high pressure. Thereupon, by a still different pitch in the screw 68, the latter raises the pressure and therefore, the temperature, of the product still higher before the material passes through the die 98 and into the coned nose section 58. All the while, the rise in temperature of the product may be enhanced by the steam that can be introduced into the jacket 140 through the inlet 134. Die 98 operates to alleviate pressure loss in the section 58 by back pressure which would otherwise tend to cause reverse movement of the product, or impede its continuous advancement. Furthermore, the agitator 102 operates to continually feed the product through the die 98 uniformly and without clogging or substantial reduction in the rate of continuous advancement of such product through the head 50.

Finally, in the nose section 58, by virtue of its conical configuration and the complemental shape of the screw 70, the mass of material is gradually, yet rapidly and substantially compressed as it approaches the die 104, since the rate of flow into the section 58 remains uniform through the die 98 and discharge from the section 58 is at all times impeded by the presence of die 104. By way of example, especially when a product such as soybeans, field beans or field peas is being treated in apparatus 8, the pressure within section 58 should be sufficiently great to raise the temperature of the product to a level of approximately 250° F. to 300° F. measured just inboard of the final die 104 before the product is forced outwardly through die 104. Again it is to be noted that the temperature rise in the product is enhanced by the presence of steam within the jacket 142 surrounding the section 58, as well as by introduction of steam into section 58, if desired, via inlet 59. The use of the cone nose section 58 is an extremely important feature of the present process because utilization of apparatus of this type permits continuous, uninterrupted cooking or treatment of products as set forth above in an economical, effective, efficient and uniform manner without the necessity of employing expensive controls and processing equipment. The cone nose section 58 serves the very important function of achieving a time-temperature ratio in the cooking of the product which is calculated to bring the temperature to the required level without holding the product at this temperature for so long a period as would result in harmful effects to the nutritional qualities of the product.

The product emerges from section 58 as a plurality of extruded ribbons and which are cut into predetermined lengths by the rotating blades 114. The pellets thereby produced upon cooling of the material may be either ground and mixed with other substances for use in that condition, or repelleted, or the material may be fed in the form directly obtained from apparatus 8.

By way of example only, and employing apparatus such as described above, it has been found that the growth inhibitor in soybeans may be destroyed or effectively repressed by processing raw, dehulled, ground, full-fat soybeans in the following manner. If the tubes 14 and 28 are each twelve feet long, the cylinder 36, five feet long and the head 50 about four feet long, it has been determined that individual particles should be passed through the preconditioner defined by tubes 14 and 28 in a period of approximately one and one-half to three minutes, the particles should then be passed through the mixer and conditioning chamber 36 in approximately seven to thirty seconds, and then passed through the first section of head 50 to steam lock die 98 in about twenty-five to thirty-five seconds. The particles are retained in the cone nose section 58 for approximately seven to thirty seconds. Thus, it can be seen that the product may be raised from room temperature to a temperature of from 250° F. to 300° F. within a relatively short period and with the growth inhibitor therein being destroyed or effectively repressed without in any way adversely affecting the nutritive value of the product. The utilization of compression cone section 56 permits gradual and progressive raising of the temperature of the product to the required level of approximately 250° F. to 300° F. without the temperature of the product going substantially past the required point, by virtue of the manner in which the pressure on the product is instantaneously released as soon as the product passes through the die 104.

It is also important to note that in most instances, more efficient and less expensive results can be obtained if the product to be treated is initially ground or flaked in a conventional hammer mill or similar equipment, prior to being processed in apparatus 8. The method is not dependent on prior grinding of the product but more expeditious treatment and raising of the temperature of the material to the required level is obtained with less steam being used if the product is reduced to a relatively fine particular state before processing thereof as outlined above. Grinding or flaking of the product increases the surface area thereof and thereby permits the heat supplied to the product to more quickly and efficiently raise the temperature thereof, within apparatus 8.

Another important advantage of the instant method relates to the fact that the treatment operation may be carried out in a combination multiple purpose ring type and extrusion pellet mill which has been modified by adding an expansion pelleting assembly comprising an air lock die, air lock die clamp, coned nose section and die, modified screen assembly, and the aforementioned preconditioner machines as referred to above are also known as pellet mills and the present process greatly extends the utility of the subject equipment in that a number of materially different processing operations may be carried out in the same machine.

If it is desired to raise the temperature to a subcritical point and to maintain this temperature for a longer period of time (as, for example, in the treating of certain products) a section 150 terminating in a steam lock die 198 similar to die 98 is introduced just outboard of the latter.

Section 150 includes a tubular housing 154 provided with rifling 161 therewithin extending longitudinally thereof and around the entire circumference of its inner surface. A circular, section clamp 164 similar to clamp 64 secures housing 154 to housing 54.

A screw 166 within housing 154 is coaxial with and coupled to screw 66 for rotation therewith. Screw 166 is also coupled with screw 70 so that the latter will also rotate with screw 66.

Die 198 at the outboard end of housing 154 may be of the same construction as die 98 and to this end, die 198 is provided with openings therethrough whereby material within housing 154 and advanced by screw 166 will pass through die 198 and into section 58.

It should be pointed out, however, that even when section 150 is utilized, the product is elevated to the maximum temperature only in the cone nose section 58 and the product is held at this temperature only for a short period of time, namely from approximately seven to thirty seconds.

If a section such as 150 is utilized, and this may be desirable particularly with seeds having a high oil content or for mixtures containing proteinaceous vegetable material when some additional pugging or kneading action is required, the temperature of the dough would be elevated in this section approximately 10° F. to 20° F. above the temperature of the product as it leaves the die 98 of the initial section of the extruder or head 50. The particles are retained in the section 150 an additional time of approximately ten to twenty seconds. The temperature of the product is ordinarily elevated approximately 10° F. to 20° F. in the initial section of the extruder (measured just inboard of die 98). The temperature of the product is elevated in the cone nose section 58 approximately 25° F. to 60° F. depending upon the configuration of the screws used in this section and also upon the thickness of the final die 104 and the configuration of the openings 99.

It is important to note that since the maximum temperature of the product is achieved progressively in the cone nose section 58 as the product traverses this section, the product is retained at this maximum temperature for only a very short time interval. Thus, for example, if the product enters section 58 at a temperature of 230° F. just outboard of the final steam lock die 98 or 198 and the product is in section 58 for a matter of fifteen seconds, the maximum temperature is not achieved throughout the entire fifteen seconds. The maximum temperature is reached only in the final several seconds of the continuous travel of the product through the machine. The product is then extruded through die 104 whereupon the temperature of the product immediately drops from the maximum level.

The presence of moisture in the product during the treatment process is desirable. Thus, although these percentages are not critical to this process, it has been found that good results have been obtained with a moderate moisture content in the product ranging from about 14% to 35% or even more.

The precise moisture content of the product when the maximum temperatures are achieved is not reflected by the moisture content of the product after the latter passes through die 104. Thus, the moisture content of dehulled, ground, full-fat soybeans might be from 8% to 14% as the material enters hopper 10. The moisture content of this mixture upon leaving the high speed mixer 36 might be about 14% to 22%. Because of the high temperatures imparted to the product (especially in the cone nose section 58) it is impossible to obtain an accurate measurement of moisture immediately after the product is extruded. The high temperature of the product will flash off as steam much of the moisture content thereof during the period of product cooling. During this period the product is not in a condition of stability insofar as moisture is concerned and measurement at the instant of extrusion from die 104 is impossible.

However, it is possible to measure the moisture of the product leaving the high speed mixer. It can safely be assumed that the product moisture content at the instant of extrusion is identical or very close to the moisture content of the product when the latter leaves the high speed mixer since no water or steam is added in the extruder head 50 when treating soybeans.

Within a period of two minutes after leaving the extruder, these products will normally flash off approximately 5% to 10% of their own moisture content. This results from the elevated temperature levels achieved in the extrusion operation.

In carrying out the process of this invention, it has been found that best results are ordinarily achieved when the product is caused to reach the optimum temperature level of approximately 250° F. to 300° F. in the cone nose section immediately inboard of the final die. However, there are circumstances in which it might be desirable to alter this temperature range slightly. For example, when treating full-fat soy product which is to be used by the baking industry it may be desirable to limit the maximum temperature level to as little as 225° F. to 240° F. Such limitation results from the fact that the baking industry normally requires some enzymic activity in the full-fat soy flour itself and this objective can be achieved by treating at these lower temperatures.

When it is desired to cook mixtures of cereals and ground oleaginous seeds or pulses, it may be advantageous to achieve maximum temperature levels somewhat higher than the optimum range of from approximately 250° F. to 300° F. Such higher temperature levels are practical and apparently do no harm to the biological value of nutrient constituents such as protein until the temperatures exceed about 340° F. Manifestly, when such higher temperatures are achieved, it may be necessary to increase the rate of travel of the product to insure that the product is not kept at a high temperature for a sufficient length of time to harm the product.

Having thus described the invention, what is claimed as new and desired to be secured by Letters Patent is:

1. A method of processing a full-fat product from the group consisting of soybeans, field beans and field peas, bengal gram, chick pea, garbanzo, lima beans, navy beans, kidney beans, pinto beans and white beans, and containing a heat labile growth inhibitor, comprising the steps of continuously advancing the product along a path of travel; raising the temperature of the product to about 180° to 210° F. and increasing the moisture content thereof in a first zone not appreciably more than 5% to 10% within a time period of approximately one and one-half to three minutes; and increasing the pressure of the product and raising the temperature of the same in a second zone to at least approximately 250° F. within a time period of less than about thirty seconds to thereby substantially reduce the growth inhibiting effects of said inhibitor.

2. A method of processing a full-fat oleaginous product from the group consisting of soybeans, field beans and field peas, bengal gram, chick pea, garbanzo, lima beans, navy beans, kidney beans, pinto beans and white beans, and containing a growth inhibitor, comprising the steps of continuously advancing the product along a path of travel; raising the temperature of the product to about 180° to 210° F. and increasing the moisture content thereof in a first zone not appreciably more than 5% to 10% within a time period of approximately one and one-half to three minutes; and increasing the pressure on the product and raising the temperature of the same in a second zone to approximately 250° to 300° F. within a time period of less than about thirty seconds to thereby substantially reduce the growth inhibiting effects of said inhibitor.

3. A method of processing a full-fat oleaginous product from the group consisting of soybeans, field beans and field peas, bengal gram, chick pea, garbanzo, lima beans, navy beans, kidney beans, pinto beans and white beans, and containing a growth inhibitor comprising the steps of continuously advancing the product along a path of travel; raising the temperature of the product to about 180° to 210° F. and increasing the moisture content thereof in a first zone not appreciably more than 5% to 10% within a time period of approximately one and one-half to three minutes; and increasing the pressure on the product and raising the temperature of the same in a second zone to approximately 250° F. within a time period of between about seven and thirty seconds to thereby substantially reduce the growth inhibiting effects of said inhibitor.

4. A method of processing a full-fat oleaginous product from the group consisting of soybeans, field beans and field peas, bengal gram, chick pea, garbanzo, lima beans, navy beans, kidney beans, pinto beans and white beans, and containing a heat susceptible growth inhibiting material, comprising the steps of continuously advancing the product along a path of travel; raising the temperature of the product to about 180° to 210° F. and increasing the moisture content thereof in a first zone not appreciably more than 5% to 10% within a time period of three minutes and increasing the pressure on the product and raising the temperature of the same in a second zone to at least approximately 250° F. within a time period of less than about thirty seconds to thereby substantially reduce the growth inhibiting effects of said material.

5. A method of processing a full-fat oleaginous product from the group consisting of soybeans, field beans and field peas, bengal gram, chick pea, garbanzo, lima beans, navy beans, kidney beans, pinto beans and white beans, and containing a heat susceptible growth inhibiting material, comprising the steps of continuously advancing the product along a path of travel; raising the temperature of the product to about 180° to 210° F. and increasing the moisture content thereof in a first zone not appreciably more than 5% to 10% within a time period of approximately one and one-half to three minutes; and increasing the pressure on the product and raising the temperature of the same in a second zone to at least approximately 250° to 300° F. within a time period of between about seven to thirty seconds to thereby substantially reduce the growth inhibiting effects of said material.

6. A method of processing a full-fat oleaginous product from the group consisting of soybeans, field beans and field peas, bengal gram, chick pea, garbanzo, lima beans, navy beans, kidney beans, pinto beans and white beans, and containing a heat susceptible growth inhibiting material, comprising the steps of continuously advancing the product along a path of travel; raising the temperature of the product to about 180° to 210° F. in a first zone within a time period of approximately one and one-half to three minutes; increasing the moisture content of the product in said first zone not appreciably more than 5% to 10%; continuously agitating the product in a mixing zone within a time period of approximately seven to thirty seconds while increasing the temperature thereof approximately 5° F.; and increasing the pressure on the product and raising the temperature of the same in a third zone to approximately 250° to 300° F. within a time period of between about seven to thirty seconds to thereby substantially reduce the growth inhibiting effects of said material.

7. A method of processing a full-fat oleaginous product from the group consisting of soybeans, field beans and field peas, bengal gram, chick pea, garbanzo, lima beans, navy beans, kidney beans, pinto beans and white beans, and containing a heat susceptible growth inhibiting material, comprising the steps of continuously advancing the product along a path of travel; raising the temperature of the product to about 180° to 210° F. and increasing the moisture content thereof in a first zone not appreciably more than 5% to 10% within a time period of approximately one and one-half to three minutes; increasing the pressure on the product and raising the temperature of the same in a second zone to at least approximately 250° F. within a time period of less than about thirty seconds to thereby substantially reduce the growth inhibiting effects of said material; and substantially instantaneously releasing the pressure on the continuously advancing product as the same emerges from said second zone to quickly lower the temperature thereof.

8. A method of processing a ground, dehulled, full-fat oleaginous product of the group consisting of soybeans, field beans and field peas, said product containing a heat susceptible trypsin inhibiting material and from about 8% to 14% moisture content; raising the temperature of the product to about 180° to 210° F. and increasing the moisture content thereof in a first zone not appreciably more than 5% to 10% within a time period of approximately one and one-half to three minutes while continuously agitating the product; continuously agitating the product in a high speed mixing zone within a time period of approximately seven to thirty seconds while increasing the temperature thereof approximately 5° F. and increasing the moisture content of the product to a level of from 14% to 22%; and increasing the pressure on the product and raising the temperature of the same in a third zone to approximately 250° to 300° F. within a time period of between about seven to thirty seconds to thereby substantially reduce the trypsin inhibiting effects of said material.

References Cited
UNITED STATES PATENTS

| | | | |
|---|---|---|---|
| 2,162,729 | 6/1939 | Levinson et al. | 99—2 |
| 2,260,254 | 10/1941 | Kruse et al. | 99—98 |
| 3,117,006 | 1/1964 | Wenger | 99—80 |
| 3,290,155 | 12/1966 | Mustakas et al. | 99—98 |

OTHER REFERENCES

Markley, K. S.: Soybeans and Soybean Products, Interscience Publishing, Inc., New York, vol. II, 1951, pp. 904–908.

RAYMOND N. JONES, *Primary Examiner.*

HYMAN LORD, *Examiner.*

S. E. HEYMAN, *Assistant Examiner.*